United States Patent
Zhao et al.

(10) Patent No.: US 12,485,584 B2
(45) Date of Patent: Dec. 2, 2025

(54) INTEGRATED TOWER FOR REMOVING VOC FROM POLYPROPYLENE PARTICLES

(71) Applicant: TIANHUA INSTITUTE OF CHEMICAL MACHINERY AND AUTOMATION CO., LTD., Gansu (CN)

(72) Inventors: Xu Zhao, Gansu (CN); Yonggong Ling, Gansu (CN); Tao Zhou, Gansu (CN); Yan Gao, Gansu (CN); Kaixuan Ma, Gansu (CN); Qingsheng Dong, Gansu (CN); Xiaoling Xie, Gansu (CN)

(73) Assignee: TIANHUA INSTITUTE OF CHEMICAL MACHINERY AND AUTOMATION CO., LTD., Gansu (CN)

( * ) Notice: Subject to any disclaimer, the term of this patent is extended or adjusted under 35 U.S.C. 154(b) by 0 days.

(21) Appl. No.: 18/258,517

(22) PCT Filed: Feb. 18, 2022

(86) PCT No.: PCT/CN2022/076913
§ 371 (c)(1),
(2) Date: Jun. 20, 2023

(87) PCT Pub. No.: WO2023/087561
PCT Pub. Date: May 25, 2023

(65) Prior Publication Data
US 2024/0109226 A1    Apr. 4, 2024

(30) Foreign Application Priority Data
Nov. 17, 2021   (CN) .......................... 202111362838.1

(51) Int. Cl.
*B29B 13/02*    (2006.01)
*B29B 9/08*    (2006.01)
(Continued)

(52) U.S. Cl.
CPC .............. *B29B 13/021* (2013.01); *B29B 9/08* (2013.01); *B29B 13/045* (2013.01); *B29B 13/065* (2013.01)

(58) Field of Classification Search
CPC ....... B29B 13/021; B29B 9/08; B29B 13/045; B29B 13/065; B29B 13/02; B29B 13/06;
(Continued)

(56) References Cited

FOREIGN PATENT DOCUMENTS

| CN | 1557741 A | * 12/2004 |
|---|---|---|
| CN | 103231501 A | 8/2013 |

(Continued)

*Primary Examiner* — S. Behrooz Ghorishi
(74) *Attorney, Agent, or Firm* — MUNCY, GEISSLER, OLDS & LOWE, P.C.

(57) ABSTRACT

In a tower integrated by the heating and drying section and the cooling section, both sides of the heating and drying section housing are provided with an air inlet box and an air outlet box; the air inlet box is communicating with a heat exchanger and distribution pipes in the heating and drying section housing, the air outlet box is communicating with distribution pipes in the heating and drying section housing and a dust remover; both sides of the cooling section housing are provided with an air inlet box and an air outlet box; the air inlet box is communicating with a heat exchanger and distribution pipes in the cooling section housing; the air outlet box is communicating with distribution pipes in the cooling section housing and a dust remover. The integral device improves the heat exchange effect and preventing the polypropylene particles from aging.

9 Claims, 1 Drawing Sheet

(51) Int. Cl.
*B29B 13/04* (2006.01)
*B29B 13/06* (2006.01)

(58) Field of Classification Search
CPC ........ B29B 2013/005; C08F 6/00; C08F 6/28;
C08F 10/06; C08L 23/12; F28D 7/16;
Y02A 50/20
See application file for complete search history.

(56) References Cited

FOREIGN PATENT DOCUMENTS

| | | | | | |
|---|---|---|---|---|---|
| CN | 108466383 | A | * | 8/2018 | ............... B29B 9/16 |
| CN | 109181106 | A | | 1/2019 | |
| CN | 109694421 | A | | 4/2019 | |
| CN | 109751859 | A | * | 5/2019 | |
| CN | 109751891 | A | | 5/2019 | |
| CN | 109764699 | A | | 5/2019 | |
| CN | 209246642 | U | * | 8/2019 | |
| JP | 5867704 | A | | 4/1983 | |

* cited by examiner

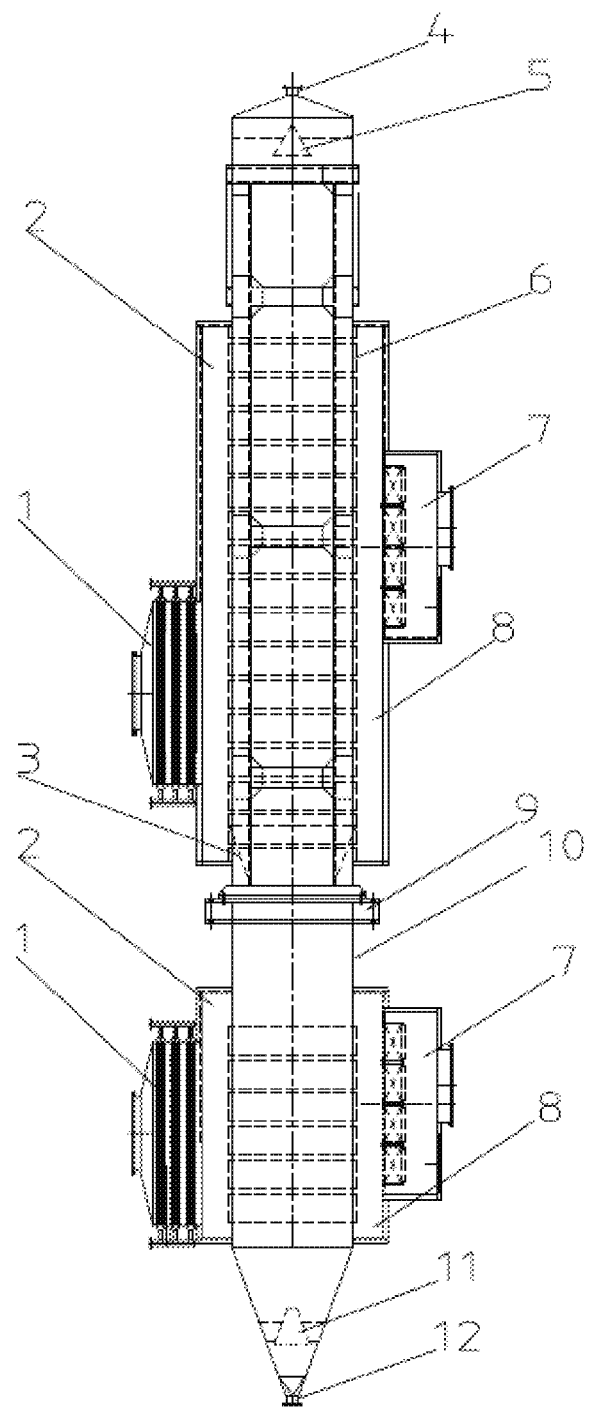

INTEGRATED TOWER FOR REMOVING VOC FROM POLYPROPYLENE PARTICLES

FIELD

The present invention relates to the technical field of the drying tower, and particularly to an integrated tower for removing VOC from polypropylene particles.

BACKGROUND

Polypropylene is widely used in automotive trims such as dashboard, control panel, door panel, seat parts, glove box and air conditioning system due to its excellent mechanical and processing properties, accounting for about 40% of automotive plastics. At present, most of domestic polypropylene products are produced by liquid phase mass polymerization, and the VOC content in the product exceeds 200 ppm. Polypropylene products release VOC harmful to human health in varying degrees at high temperatures.

The Guideline for Air Quality Assessment of Passenger Car (GB/T27630) has been revised from a recommendatory guideline to a mandatory national standard. The automobile industry has stipulated that the VOC content in polypropylene is less than 80 ppm.

In order to meet the market demands and environmental requirements, polypropylene manufacturers must further reduce the VOC content in polypropylene. At present, Tianhua Institute of Chemical Machinery & Automation Co., Ltd. has designed and completed a gas heating type drying tower for removing VOC (application No.: CN109751859A) and a cooling tower for cooling materials with VOC removed from polypropylene (application No.: CN109764699A). However, the above two devices are independent and need to be used in series, resulting in a device level up to 40 meters high. In addition, the above two devices have many inlets and outlets: each inlet is provided with a heater, and each outlet is provided with a filter, resulting in complex system pipelines, many heat exchangers, filters, and fans, resulting in high equipment and civil engineering costs. In order to solve the above problems, the present invention is to design an integrated tower for removing VOC from polypropylene particles.

SUMMARY

Based on the above, the present invention aims to provide an integrated tower for removing VOC from polypropylene particles, which can integrate the drying tower, heat exchanger and filter, reduce the number of pipes, heat exchangers and fans, thus reducing the investment cost.

To this regard, the present invention provides An integrated tower for removing VOC from polypropylene particles, wherein the top and bottom of the tower are respectively provided with a feed inlet and a discharge port, and the middle section of the tower includes a heating and drying section housing and a cooling section housing which are communicating with each other; the heating and drying section housing and the cooling section housing are both provided with distribution pipes.

Both sides of the heating and drying section housing are respectively provided with a first air inlet box and a first air outlet box; the first air inlet box is respectively communicating with the first heat exchanger and distribution pipes in the heating and drying section housing, and the first heat exchanger is communicating with a blower; the first air outlet box is communicating with the distribution pipes in the heating and drying section housing.

Both sides of the cooling section housing are respectively provided with a second air inlet box and a second air outlet box; the second air inlet box is respectively communicating with a second heat exchanger and distribution pipes in the cooling section housing, and the second heat exchanger is communicating with a blower; the second air outlet box is communicating with distribution pipes in the cooling section housing.

During operation, the blower sends air to the heat exchanger, and the heat exchanger in the heating and drying section heats the air into hot air; the hot air enters the distribution pipe through the first air inlet box, and after heat exchange with the materials, it is collected as waste gas in the first air outlet box; when the first air outlet box is connected with the dust remover, the first air outlet box sends waste gas to the dust remover, and after dust removal, the waste gas can also enter the heat exchanger through the blower for recycling; the heat exchanger in the cooling section cools the air into cold air, and the cold air enters the distribution pipe through the second air inlet box; after heat exchange with the materials, it is collected as waste gas in the second air outlet box; when the second air outlet box is connected with the dust remover, the second air outlet box sends waste gas to the dust remover, and after dust removal, the waste gas can also enter the heat exchanger through the blower for recycling; at the same time, polypropylene particles enter the integrated tower for removing VOC from polypropylene particles from the feed inlet, and are heated, dried and cooled through the distribution pipes in the heating and drying section housing and the cooling section housing respectively, and then discharged through the discharge port.

According to the integrated tower for removing VOC from polypropylene particles in the present invention, preferably, the heating and drying section housing is communicating with the inside of the cooling section housing through a material aggregator.

According to the integrated tower for removing VOC from polypropylene particles in the present invention, preferably, the heating and drying section housing is communicating with the outside of the cooling section housing through a flange.

According to the integrated tower for removing VOC from polypropylene particles in the present invention, preferably, the first air outlet box and second air outlet box are further respectively communicating with the dust remover, and the dust remover is communicated with the blower.

According to the integrated tower for removing VOC from polypropylene particles in the present invention, preferably, a distributor is provided below the feed inlet in the tower for removing VOC.

According to the integrated tower for removing VOC from polypropylene particles in the present invention, preferably, a rectification body is provided above the discharge port in the tower for removing VOC.

According to the integrated tower for removing VOC from polypropylene particles in the present invention, preferably, the distribution pipes include air inlet distribution pipes and air outlet distribution pipes distributed evenly and alternately up and down in the heating and drying section housing and/or the cooling section housing.

According to the integrated tower for removing VOC from polypropylene particles in the present invention, preferably, the first heat exchanger and the second heat exchanger are independently finned tube heat exchangers.

According to the integrated tower for removing VOC from polypropylene particles in the present invention, preferably, air inlets are provided in the first air inlet box and the second air inlet box which are communicating with the distribution pipes through the air inlets.

According to the integrated tower for removing VOC from polypropylene particles in the present invention, preferably, air outlets are provided in the first air outlet box and the second air outlet box which are communicating with dust removers through the air outlets.

The beneficial effects of the present invention are as follows:

The integrated tower for removing VOC from polypropylene particles is integrated by the heating and drying section and the cooling section; in the heating and drying section, the air is heated by a heat exchanger, and the hot air is evenly fed into the air distribution pipe through the air inlet box, so that the production materials can fully contact the hot air in the distribution pipe for heat exchange, thereby strengthening the heat exchange effect, and reducing the large amount of energy consumption caused by single unit heating; in the cooling section, the air is cooled by a heat exchanger, and then the cold air is evenly fed into the air distribution pipe through the air inlet box, so as to deeply cool the heated and dried polypropylene, ensure lower temperature of polypropylene, prevent aging, and meet the users' production requirements.

The heating and drying section and cooling section of the drying tower are connected with dust removers on the right side of the air outlet box, and the outlet of the air outlet box is connected with a dust remover; upon the treatment by the dust remover, the discharged air can meet the national emission standard.

The present invention will be described in detail in combination with accompanied drawings and preferred embodiments, but the present invention is not limited thereto.

BRIEF DESCRIPTION OF THE DRAWINGS

The FIGURE is a structural diagram of the integrated tower for removing VOC from polypropylene particles in the present invention.

DETAILED DESCRIPTION

In order to make the purpose, technical solution and advantages of the present invention clearer, the drawings and embodiments are described in the following for further detailed description of the present invention. It should be understood that various embodiments described herein are merely used to explain the present invention rather than limit the present invention. The element symbols and/or letters may be reused in various embodiments of the present invention. The reuse is intended to simplify and clarify, and does not define the relationships between the embodiments and/or configurations discussed.

In the description of the present invention, it should be understood that the terms "up", "down", "left" and "right" indicate the orientation or position relationships based on the orientation and position relationships as shown in the drawings, which is only for the convenience of describing the structure and operation mode, rather than indicating or implying that the part referred to must have a specific orientation and operate in a specific orientation, so such description cannot be understood as a limitation of the present invention.

The present invention provides an integrated tower for removing VOC from polypropylene particles, wherein the top and bottom of the tower are respectively provided with a feed inlet and a discharge port, and the middle section of the tower includes a heating and drying section housing and a cooling section housing which are communicating with each other; the heating and drying section housing and the cooling section housing are both provided with distribution pipes, and both sides of the heating and drying section housing are respectively provided with a first air inlet box and a first air outlet box; the first air inlet box is respectively communicating with the first heat exchanger and distribution pipes in the heating and drying section housing, and the first heat exchanger is communicating with a blower; the first air outlet box is communicating with the distribution pipes in the heating and drying section housing, and both sides of the cooling section housing are respectively provided with a second air inlet box and a second air outlet box; the second air inlet box is respectively communicating with a second heat exchanger and distribution pipes in the cooling section housing, and the second heat exchanger is communicating with a blower; the second air outlet box is communicating with distribution pipes in the cooling section housing.

During operation, the blower sends air to the heat exchanger, and the heat exchanger in the heating and drying section heats the air into hot air; the hot air enters the distribution pipe through the first air inlet box, and after heat exchange with the materials, it is collected as waste gas in the first air outlet box; when the first air outlet box is connected with the dust remover, the first air outlet box sends waste gas to the dust remover, and after dust removal, the waste gas can also enter the heat exchanger through the blower for recycling; the heat exchanger in the cooling section cools the air into cold air, and the cold air enters the distribution pipe through the second air inlet box; after heat exchange with the materials, it is collected as waste gas in the second air outlet box; when the second air outlet box is connected with the dust remover, the second air outlet box sends waste gas to the dust remover, and after dust removal, the waste gas can also enter the heat exchanger through the blower for recycling; at the same time, polypropylene particles enter the integrated tower for removing VOC from polypropylene particles from the feed inlet, and are heated, dried and cooled through the distribution pipes in the heating and drying section housing and the cooling section housing respectively, and then discharged through the discharge port.

In some embodiments, preferably, the heating and drying section housing is communicating with the inside of the cooling section housing through a material aggregator.

In some embodiments, preferably, wherein the heating and drying section housing is communicating with the outside of the cooling section housing through a flange.

In some embodiments, preferably, the first air outlet box and second air outlet box are further respectively communicating with the dust remover, and the dust remover is communicated with the blower.

In some embodiments, preferably, a distributor is provided below the feed inlet in the tower for removing VOC.

In some embodiments, preferably, a rectification body is provided above the discharge port in the tower for removing VOC.

In some embodiments, preferably, the distribution pipes include air inlet distribution pipes and air outlet distribution pipes distributed evenly and alternately up and down in the heating and drying section housing and/or the cooling section housing.

In some embodiments, preferably, the first heat exchanger and the second heat exchanger are independently finned tube heat exchangers.

In some embodiments, preferably, air inlets are provided in the first air inlet box and the second air inlet box which are communicating with the distribution pipes through the air inlets.

In some embodiments, preferably, air outlets are provided in the first air outlet box and the second air outlet box which are communicating with dust removers through the air outlets.

As shown in the FIGURE, this embodiment provides an integrated tower for removing VOC from polypropylene particles, and the top and bottom of the tower are respectively provided with a feed inlet 4 and a discharge port 12; and a distributor 5 is provided below the feed inlet 4 in the tower for removing VOC, and a rectification body 11 is provided above the discharge port 12 in the tower for removing VOC.

The middle section of the tower includes a heating and drying section housing 6 and a cooling section housing 10 which are communicating with each other; the heating and drying section housing 6 and the cooling section housing 10 are both provided with distribution pipes distributed evenly and alternately up and down, and the distribution pipes include air inlet distribution pipes and air outlet distribution pipes; the heating and drying section housing 6 is communicating with the inside of the cooling section housing 10 through a material aggregator 3, and the outside is connected through a pipe flange 9.

The heating and drying section housing 6 is respectively provided with an air inlet box 2 and an air outlet box 8 on the left and right sides, and the air inlet box 2 is respectively communicating with the finned tube heat exchanger 1 and the distribution pipes in the heating and drying section housing 6 on the left and right sides; the finned tube heat exchanger 1 is communicating with the blower, and the air outlet box 8 is respectively communicating with the distribution pipes in the heating and drying section housing 6 and the dust remover 7 on the left and right sides;

The cooling section housing 10 is respectively provided with an air inlet box 2 and an air outlet box 8 on the left and right sides, and the air inlet box 2 is respectively communicating with the finned tube heat exchanger 1 and the distribution pipes in the cooling section housing 10 on the left and right sides; the finned tube heat exchanger 1 is communicating with the blower, and the air outlet box 8 is respectively communicating with the distribution pipes in the cooling section housing 10 and the dust remover 7 on the left and right sides.

For the integrated tower for removing VOC from polypropylene particles provided by the present invention, specifically, there are two finned tube heat exchangers 1 and dust removers 7, one in the heating and drying section and one in the cooling section, two in the air inlet box 2 and the air outlet box 8, one in the heating and drying section and one in the cooling section; the air inlet box 2 and the air outlet box 8 are symmetrically arranged outside both sides of the heating and drying section housing 8 and the cooling section housing 10, and the corresponding air inlet box 2 and air outlet box 8 are arranged on the same section outside the housing 6 and housing 10; the air is sent to the finned tube heat exchanger 1 through the blower; in the heating and drying section, the hot air treated by heating is evenly sent to the distribution pipe; after heat exchange with the materials, it is directly discharged from the distribution pipe and sent to the air outlet box 8, and then subjected to the tail gas treatment by the dust remover 7, which effectively reduces the dust content in the tail gas and is conducive to the exhaust of the tail gas; in the cooling section, the cold air treated by cooling is evenly sent to the distribution pipe; the cooled materials are directly discharged by the distribution pipe and sent to the air outlet box 8, and then subjected to the tail gas treatment by the dust remover 7.

Compared with the existing device, the integrated tower for removing VOC from polypropylene particles provided by the present invention can integrate the drying tower, heat exchanger and filter, reduce the number of pipes, heat exchangers and fans, thus reducing the investment cost.

The operation process of this embodiment is: the material to be dried enters from the material inlet 4 above the heating and drying section housing 6, enters into the drying chamber evenly through the distributor 5, flows between the housing 6 and the pipe wall of the distribution pipe, and the air heated through the finned tube heat exchanger 1 enters the distribution pipe; after drying and heat exchange of the materials, the gas after heat exchange is discharged from the distribution pipe into the air outlet box 8, and the air outlet box 8 collects the tail gas which enters the dust remover 7 for purification; the materials stay in the heating and drying section housing 6 for a period of time, and after drying, they are discharged from the material aggregator 3 below the housing 6 into the cooling section of the tower; the materials in the cooling section flow between the cooling section housing 10 and the pipe wall of the distribution pipe, and the air cooled by the finned tube heat exchanger 1 enters the distribution pipe; after the materials are deeply cooled, the gas after heat exchange is discharged from the distribution pipe into the air outlet box 8, and the air outlet box 8 collects the tail gas which enters the dust remover 7 for purification; after cooled in the housing 10, the deeply cooled materials flows out of the discharge port 12 below the cooling section housing 10 in the form of plug flow through the rectification body 11.

To sum up, the integrated tower for removing VOC from polypropylene particles is integrated by the heating and drying section and the cooling section; in the heating and drying section, the air is heated by a heat exchanger, and the hot air is evenly fed into the air distribution pipe through the air inlet box, so that the production materials can fully contact the hot air in the distribution pipe for heat exchange, thereby strengthening the heat exchange effect, and reducing the large amount of energy consumption caused by single unit heating; in the cooling section, the air is cooled by a heat exchanger, and then the cold air is evenly fed into the air distribution pipe through the air inlet box, so as to deeply cool the heated and dried polypropylene, ensure lower temperature of polypropylene, prevent aging, and meet the users' production requirements.

Moreover, the heating and drying section and cooling section of the drying tower are connected with dust removers on the right side of the air outlet box, and the outlet of the air outlet box is connected with a dust remover; after the treatment by the dust remover, the discharged air can meet the national emission standard.

The above descriptions are only illustrative embodiments of the invention, not limitation to the invention in other forms. Any skilled in the art may make modifications or variations using the disclosed technical contents to be equivalent embodiments of equivalent changes applied to other fields, but any simple modifications, equivalent changes and variations to the above embodiments according to the technical essence of the invention without departing from the technical solution of the invention still belong to the scope protected by the technical solution of the invention.

What is claimed is:

1. An integrated tower for removing volatile organic compounds (VOC) from polypropylene particles, comprising:

a top of the tower;

a bottom of the tower; and a middle section of the tower, wherein the top and bottom of the tower are respectively provided with a feed inlet and a discharge port, and the middle section of the tower includes a heating and drying section housing and a cooling section housing which are communicating with each other; the heating and drying section housing and the cooling section housing are both provided with distribution pipes, both sides of the heating and drying section housing are respectively provided with a first air inlet box and a first air outlet box; the first air inlet box is respectively communicating with a first heat exchanger and distribution pipes in the heating and drying section housing, and the first heat exchanger is communicating with a blower; the first air outlet box is communicating with the distribution pipes in the heating and drying section housing, both sides of the cooling section housing are respectively provided with a second air inlet box and a second air outlet box; the second air inlet box is respectively communicating with a second heat exchanger and distribution pipes in the cooling section housing, and the second heat exchanger is communicating with the blower; the second air outlet box is communicating with distribution pipes in the cooling section housing, during operation, the blower sends air to the first heat exchanger, and the first heat exchanger in the heating and drying section heats the air into hot air; the hot air enters the distribution pipe through the first air inlet box, and after heat exchange with the materials, it is collected as waste gas in the first air outlet box; when the first air outlet box is connected with a dust remover, the first air outlet box sends waste gas to the dust remover, and after dust removal, the waste gas can also enter the first heat exchanger through the blower for recycling;

the second heat exchanger in the cooling section cools the air into cold air, and the cold air enters the distribution pipe through the second air inlet box; after heat exchange with the materials, it is collected as waste gas in the second air outlet box; when the second air outlet box is connected with the dust remover, the second air outlet box sends waste gas to the dust remover, and after dust removal, the waste gas can also enter the second heat exchanger through the blower for recycling; at the same time, polypropylene particles enter the integrated tower for removing VOC from polypropylene particles from the feed inlet, and are heated, dried and cooled through the distribution pipes in the heating and drying section housing and the cooling section housing respectively, and then discharged through the discharge port, and wherein the heating and drying section housing is communicating with the inside of the cooling section housing through a material aggregator.

2. The integrated tower for removing VOC from polypropylene particles according to claim 1, wherein the heating and drying section housing is communicating with the outside of the cooling section housing through a flange.

3. The integrated tower for removing VOC from polypropylene particles according to claim 1, wherein the first air outlet box and second air outlet box are further respectively communicating with the dust remover, and the dust remover is communicating with the blower.

4. The integrated tower for removing VOC from polypropylene particles according to claim 1, wherein a distributor is provided below the feed inlet in the tower for removing VOC.

5. The integrated tower for removing VOC from polypropylene particles according to claim 1, wherein a rectification body is provided above the discharge port in the tower for removing VOC.

6. The integrated tower for removing VOC from polypropylene particles according to claim 1, wherein the distribution pipes include air inlet distribution pipes and air outlet distribution pipes distributed evenly and alternately up and down in the heating and drying section housing and/or the cooling section housing.

7. The integrated tower for removing VOC from polypropylene particles according to claim 1, wherein the first heat exchanger and the second heat exchanger are independently finned tube heat exchangers.

8. The integrated tower for removing VOC from polypropylene particles according to claim 1, wherein air inlets are provided in the first air inlet box and the second air inlet box which are communicating with the distribution pipes through the air inlets.

9. The integrated tower for removing VOC from polypropylene particles according to claim 1, wherein air outlets are provided in the first air outlet box and the second air outlet box which are communicating with the dust remover through the air outlets.

* * * * *